United States Patent [19]
Klein

[11] Patent Number: 6,065,069
[45] Date of Patent: *May 16, 2000

[54] CIRCUIT FOR SENSING AND AUTOMATICALLY SWITCHING BETWEEN AN INTERNAL AND EXTERNAL USER I/O DEVICE

[75] Inventor: Dean A. Klein, Eagle, Id.

[73] Assignee: Micron Electronics, Inc., Nampa, Id.

[ * ] Notice: This patent issued on a continued prosecution application filed under 37 CFR 1.53(d), and is subject to the twenty year patent term provisions of 35 U.S.C. 154(a)(2).

[21] Appl. No.: 08/680,370

[22] Filed: Jul. 15, 1996

[51] Int. Cl.[7] .............................. G06F 3/00; G06F 13/00
[52] U.S. Cl. ............................................. 710/15; 710/103
[58] Field of Search .................... 395/283, 500; 364/709.12; 710/103, 15–17

[56] References Cited

U.S. PATENT DOCUMENTS

| | | | |
|---|---|---|---|
| 4,037,909 | 7/1977 | Trompeter et al. | 439/584 |
| 4,575,714 | 3/1986 | Rummel | 340/468 |
| 4,794,525 | 12/1988 | Pickert et al. | 713/300 |
| 4,862,355 | 8/1989 | Newman et al. | 710/16 |
| 4,872,004 | 10/1989 | Bahnick et al. | 340/825.5 |
| 5,136,694 | 8/1992 | Belt et al. | 710/67 |
| 5,184,314 | 2/1993 | Kelly et al. | 708/131 |
| 5,278,958 | 1/1994 | Dewa | 710/16 |
| 5,323,291 | 6/1994 | Boyle et al. | 361/686 |
| 5,341,316 | 8/1994 | Nishigaki | 708/142 |
| 5,379,437 | 1/1995 | Celi, Jr. et al. | 713/1 |
| 5,408,669 | 4/1995 | Stewart et al. | 395/708 |
| 5,414,421 | 5/1995 | Saito | 341/22 |
| 5,530,893 | 6/1996 | Sugi | 710/5 |
| 5,561,822 | 10/1996 | Ham | 710/36 |
| 5,608,895 | 3/1997 | Lee | 395/500 |
| 5,610,601 | 3/1997 | Lahti et al. | 341/22 |
| 5,669,015 | 9/1997 | Chidester et al. | 439/584 |
| 5,781,798 | 7/1998 | Beatty et al. | 710/10 |
| 5,835,791 | 11/1998 | Goff et al. | 710/62 |
| 5,852,743 | 12/1998 | Yeh | 710/18 |
| 5,898,425 | 4/1999 | Sekine | 345/168 |
| 5,905,914 | 5/1999 | Sakai et al. | 710/67 |
| 5,987,545 | 11/1999 | Oh | 710/100 |

OTHER PUBLICATIONS

Walter H. Buschbaum, Encyclopedia of Integrated Circuits: A Practical Handbook of Essential Reference Data, pp. 23–25, 1981.

James W. Nilsson, Electrical Circuits, pp. 48–49, 1986.

*Primary Examiner*—Zarni Maung
*Assistant Examiner*—Andrew Caldwell
*Attorney, Agent, or Firm*—Trop, Pruner & Hu, P.C.

[57] ABSTRACT

A circuit for sensing when an external pointing device is connected to a portable computer system detects the device's power consumption and automatically switches to it without requiring that the computer system to be power cycled or reset. Further, the circuit can detect when an external pointer device is disconnected and, in response, automatically switch to the computer system's internal pointer device. The sensor comprises a small resistor in series with the power supply for the external device. When the external device is attached, the power consumption of the external device results in a voltage drop across the resistor, which may be detected with a voltage comparator. In one embodiment, when the sensor detects that an external pointer device has been connected it generates a static signal to control the operation of a switch. Based upon input from the sensor, the switch routes all appropriate signals from either the internal or external pointer device to a standard microcontroller device. In an alternative embodiment, sensor output is connected directly to a microcontroller which is modified (via its firmware) to select either the computer system's internal pointer device or external pointer device based on sensor output.

32 Claims, 6 Drawing Sheets

CIRCUIT FOR SENSING AND AUTOMATICALLY SWITCHING BETWEEN AN INTERNAL AND EXTERNAL USER I/O DEVICE

1. BACKGROUND OF THE INVENTION

The invention relates in general to the use of pointer devices in a computer system. And specifically a means for the automatic detection and selection of an external pointer device by an operational computer system.

Pointing devices are well known in the computer field. Many, if not most, modern computer systems have at least one such device. Example pointer devices include, but are not limited to, a mouse, a trackball, a capacitive touch pad, a joy stick, and a keyboard. Portable computer systems such as laptop and notebook computers typically have built-in pointing devices. Often built-in pointing devices are regarded by many users as not being as comfortable to use as standard external pointing devices. Accordingly, many portable computers have the capability of attaching an external pointing device through a port, e.g., a serial port.

For a pointing device to be useable, the central processing unit (CPU) of the computer system must recognize that the device is connected to the computer. In many, if not most portable computer systems, the CPU checks for the presence of pointing devices only at the initial power-up or upon a hardware reset of the computer system. Thus, if only a built-in pointing device is present at the time of power-up or reset, a subsequently-attached external pointing device will not be recognized, and thus will not be useable. On the other hand, if an external pointing device is present at the time the computer system is powered-up or reset but is later removed, the computer will not automatically detect and switch to the built-in pointing device.

As shown in FIG. 1, a typical portable computer system 100 comprises a built-in keyboard 105, a built-in pointer device 110, a built-in display 115, a central processing unit (CPU) 120, memory 125, and a microcontroller 130. The built-in pointer device 110 can be any convenient type such as those described above. Those of ordinary skill in the field of computer system's design will recognize that the microcontroller 130 is usually a special-purpose microprocessor specifically designed to provide an interface between input-output (I/O) devices, such as a keyboard or pointer device, and the CPU 120. In general, a microcontroller 130 for use in a portable computer system 100 will have a number of ports through which I/O devices may be connected.

In particular, a microcontroller port used to interface common pointer device normally allows for the bi-directional transmission of multiple signals simultaneously. That is, the connection between an internal pointer device 110 and the microcontroller 130 comprises a bus structure 135. For a serial pointer device, the bus 135 may consist of a clock signal path, and a data signal path. (In addition, power and ground signal paths are also present.) It will further be recognized by those of ordinary skill that the microcontroller 130 may contain both permanent memory and working memory. Permanent memory may be used to store the microcontroller's operational instructions and is often referred to as firmware 140. Working memory is typically implemented as static random access memory (SRAM), and is used by the microcontroller to temporarily store information needed for it to carry out its tasks.

During operation, the microcontroller 130 may periodically poll each (or any selected subset) of its ports to determine whether any input exists which must be processed and/or routed to the CPU 120. Illustrative microcontrollers suitable for use in a portable computer system include the INTEL UPI-41 and 80C51 microcontrollers. A microcontroller 130, when used to process information to and from a keyboard 105 or a pointing device, may also be referred to as a keyboard controller or keyboard microcontroller.

2. SUMMARY OF THE INVENTION

The invention is directed to a circuit for automatically detecting and switching between an internal pointer device and an externally connected pointer device without the need to either power cycle or reset the computer system. Further, the inventive circuit can automatically detect the removal of an external pointer device and switch back to using the system's internal pointer device. Further, the invention can detect when the external pointer device is disconnected from the computer system and, in response, automatically switch to the computer system's internal pointer device. The sensor comprises a small resistor in series with the power supply for the external device. When the external device is attached, the power consumption of the external device results in a voltage drop across the resistor, which may be detected with a voltage comparator. Alternative sensors, such as optical sensors, may also be used.

In one embodiment, when the sensor detects that an external pointer device has been connected, it generates a static signal to control the operation of a switch. Based upon input from the sensor, the switch routes all appropriate signals from either the internal or external pointer device to a standard microcontroller device. In an alternative embodiment, the sensor output is connected directly to a microcontroller which is modified (via its firmware) to select either the computer system's internal pointer device or external pointer device based on sensor output.

3. BRIEF DESCRIPTION OF DRAWINGS

4. DETAILED DESCRIPTION OF SPECIFIC EMBODIMENTS

Illustrative embodiments of the invention are described below as it might be implemented using standard engineering design techniques. In the interest of clarity, not all features of an actual implementation are described in this specification. It will of course be appreciated that in the development of any such actual implementation, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking of computer system design for those of ordinary skill having the benefit of this disclosure.

4.1 First Illustrative Embodiment

Figure 1:
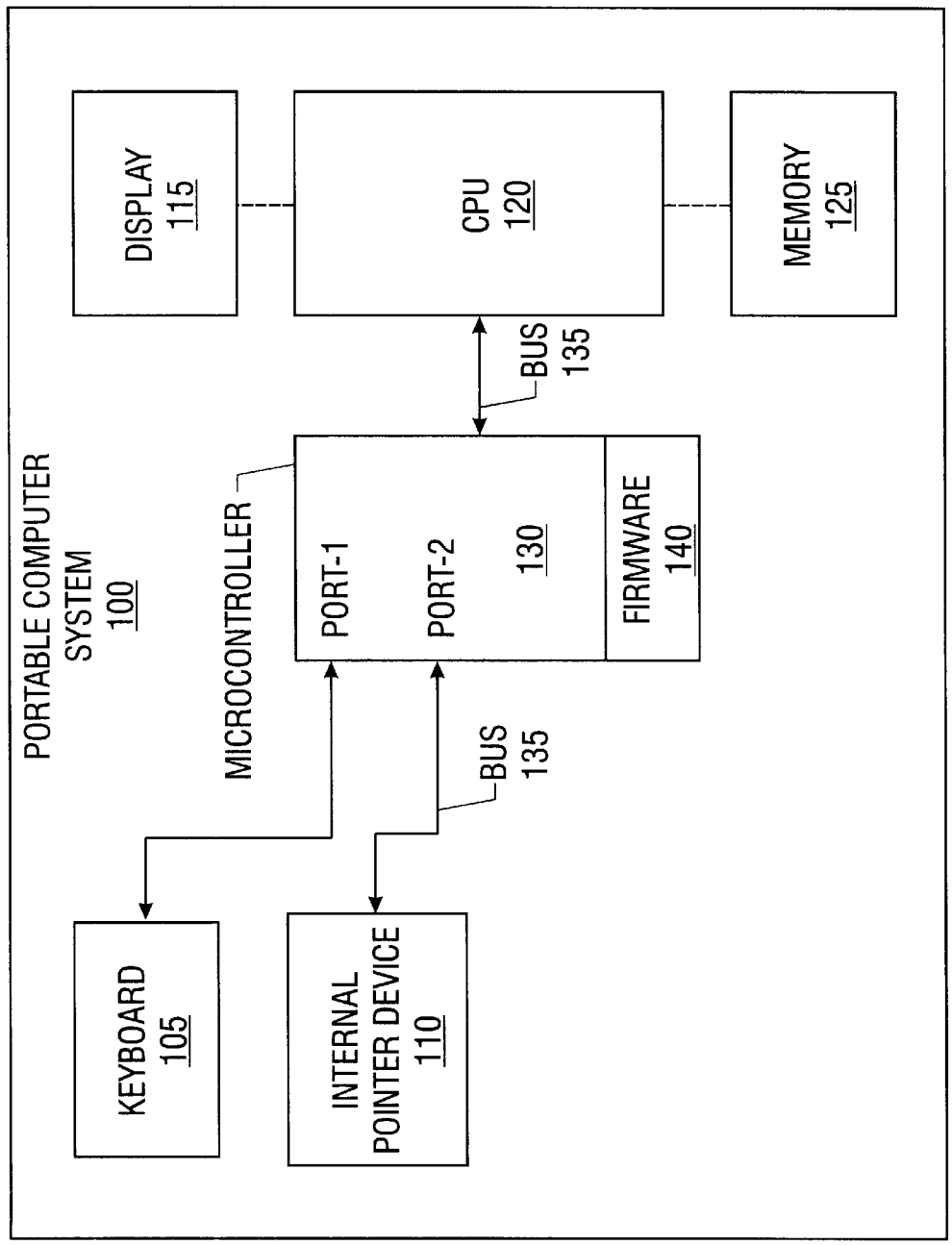
FIG. 1 is a simplified block diagram of a portable computer system.
Figure 2:
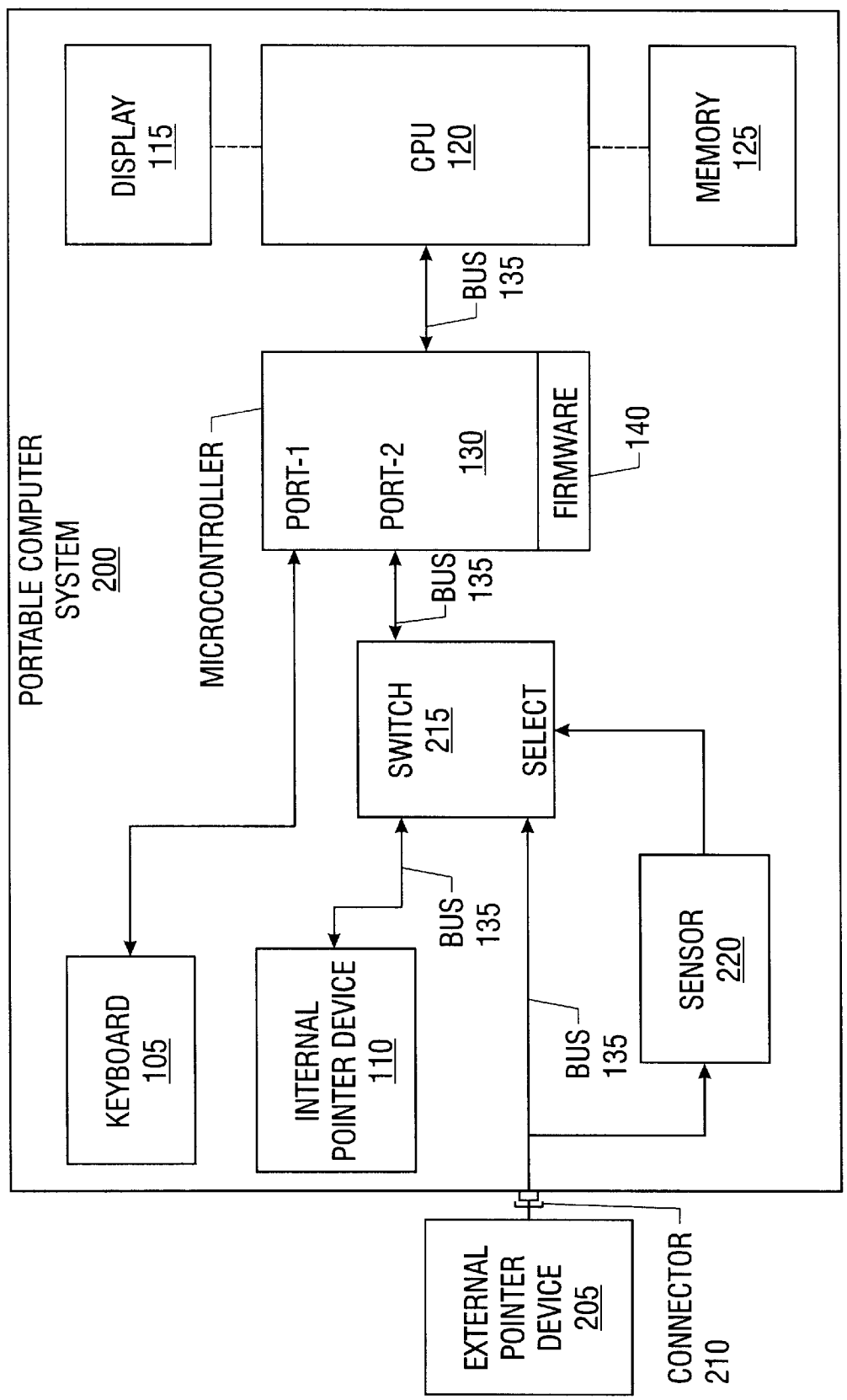
FIG. 2 is a block diagram of one embodiment in accordance with the invention.

FIG. 2 shows one embodiment of a portable computer system 200 in accordance with the invention. As shown, the illustrative embodiment comprises an external pointer device 205 connected in a conventional manner such as, for example, through a serial or PS2 connector 210. Internal to the computer system 200 both the internal pointer device 110 and the external pointer device 205 are connected to a switch 215. The switch 215 is connected, through a bus 135, to the microcontroller 130. A sensor 220 detects when an external pointer device is connected to the computer system 200 and controls the switch's behavior.

When an external pointer device is connected to the portable computer system 200, power is conventionally supplied to the external pointer device 205. Current flow, associated with this power transfer, is detected by the sensor 220 and, if it is a specified value, generates a static signal to the switch 215 causing it to operatively couple the external pointer device 205 to the microcontroller 130. In the absence of the necessary current flow (i.e., when no external pointer device 205 is connected to the computer system 200), the switch 215 operatively couples the internal pointer device 110 to the microcontroller 130.

Figure 3:
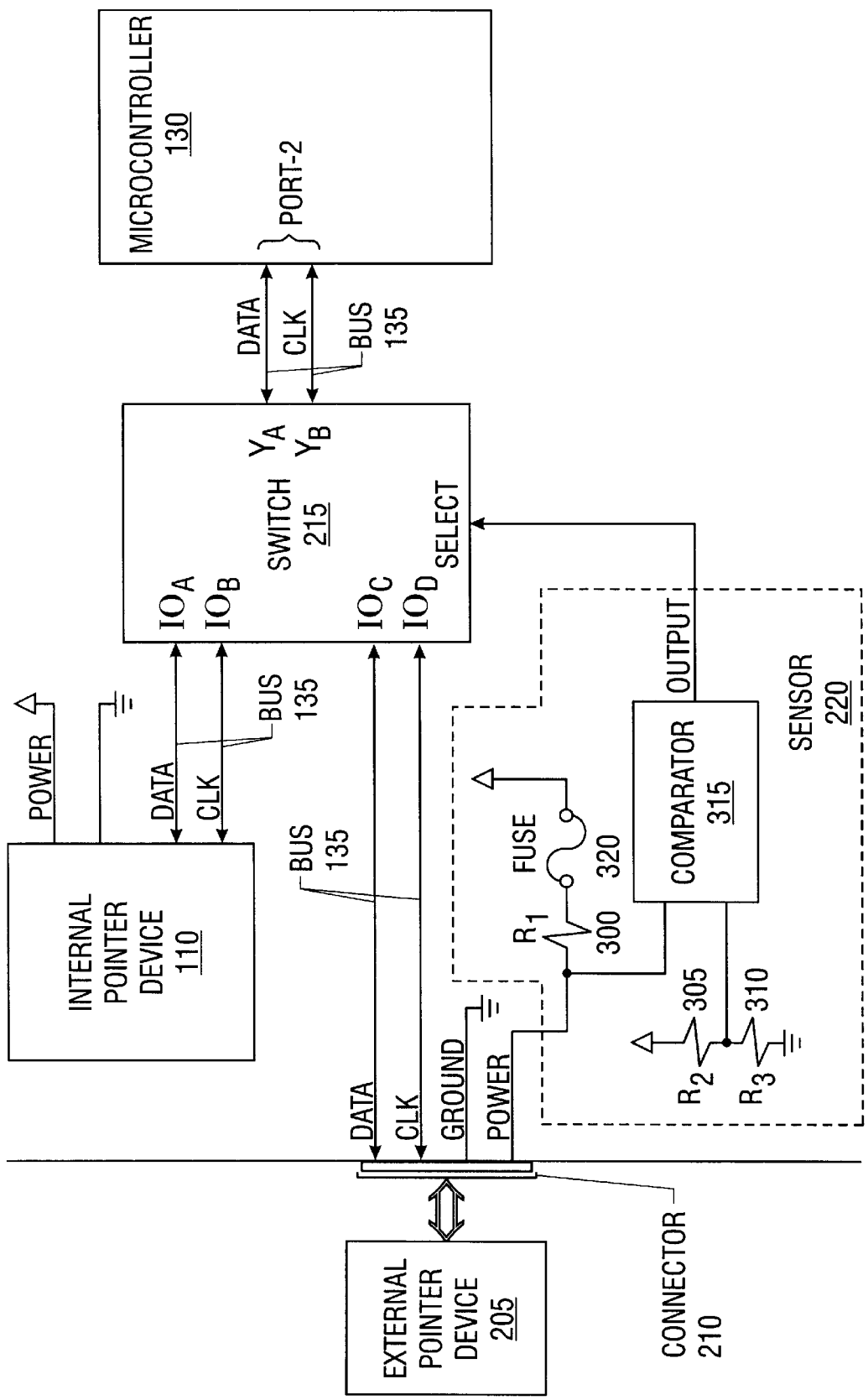
FIG. 3 shows, in expanded fashion, a circuit in accordance with FIG. 2.

FIG. 3 shows an expanded view of the switch 215 and the sensor 220 in accordance with the invention. The internal pointer device's 110 data and clock signals are connected to first and second terminals (denoted $IO_A$ and $IO_B$) on the switch 215. Similarly, the external pointer device's 205 data and clock signals are connected to third and fourth terminals (denoted $IO_C$ and $IO_D$) on the switch 215. The sensor 220 comprises a first resistor $R_1$, a second resistor $R_2$, a third resistor $R_3$, a comparator circuit 315, and a fuse 320.

When an external pointer device 205 is connected to the computer system as shown in FIG. 3, current flows through $R_1$ causing a voltage drop which is compared, by comparator 315, to a reference voltage generated by the combination of $R_2$ and $R_3$. Those of ordinary skill in the art will recognize that the combination of $R_2$ and $R_3$ forms a voltage divider circuit whose input to the comparator 315 is a function of the ratio of the individual values of $R_2$ and $R_3$. It is also well known that these values may be adjusted in coordination with the value of $R_1$ to obtain the result specified herein.

The comparator 315 generates a static output voltage signal which is connected to the switch's 215 select input. (By static, it is meant that the comparator output depends upon the existence of an external pointer device connected to the computer system and is, specifically, not dependent upon the state of the data transmission to/from the pointer device and the computer system.) If the comparator 315 detects current flow through $R_1$ (for example, the voltage across $R_1$ is equal to or substantially less that the voltage at the junction of $R_2$ and $R_3$), then its output signal selects the switch 215 so as to couple data and clock signals from the external pointer device 205 (on switch terminals $IO_C$ and $IO_D$) to the microcontroller 130. If, on the other hand, the comparator 315 does not detect current flow through $R_1$, then its output signal selects the switch 215 to couple data and clock signals from the internal pointer device 110 (on switch terminals $IO_A$ and $IO_B$) to the microcontroller 130.

If the external pointer device 205 is later disconnected from the computer system, current flow through $R_1$ ceases and, as a result, the comparator 315 causes the switch 215 to couple the internal pointer device's 110 data and clock signals to the microcontroller 130. (One illustrative switch suitable for use in the circuit of FIG. 3 is the QS3257 "QUICKSWITCH" manufactured by Quality Semiconductor, Inc.)

4.2 Second Illustrative Embodiment

Figure 4:
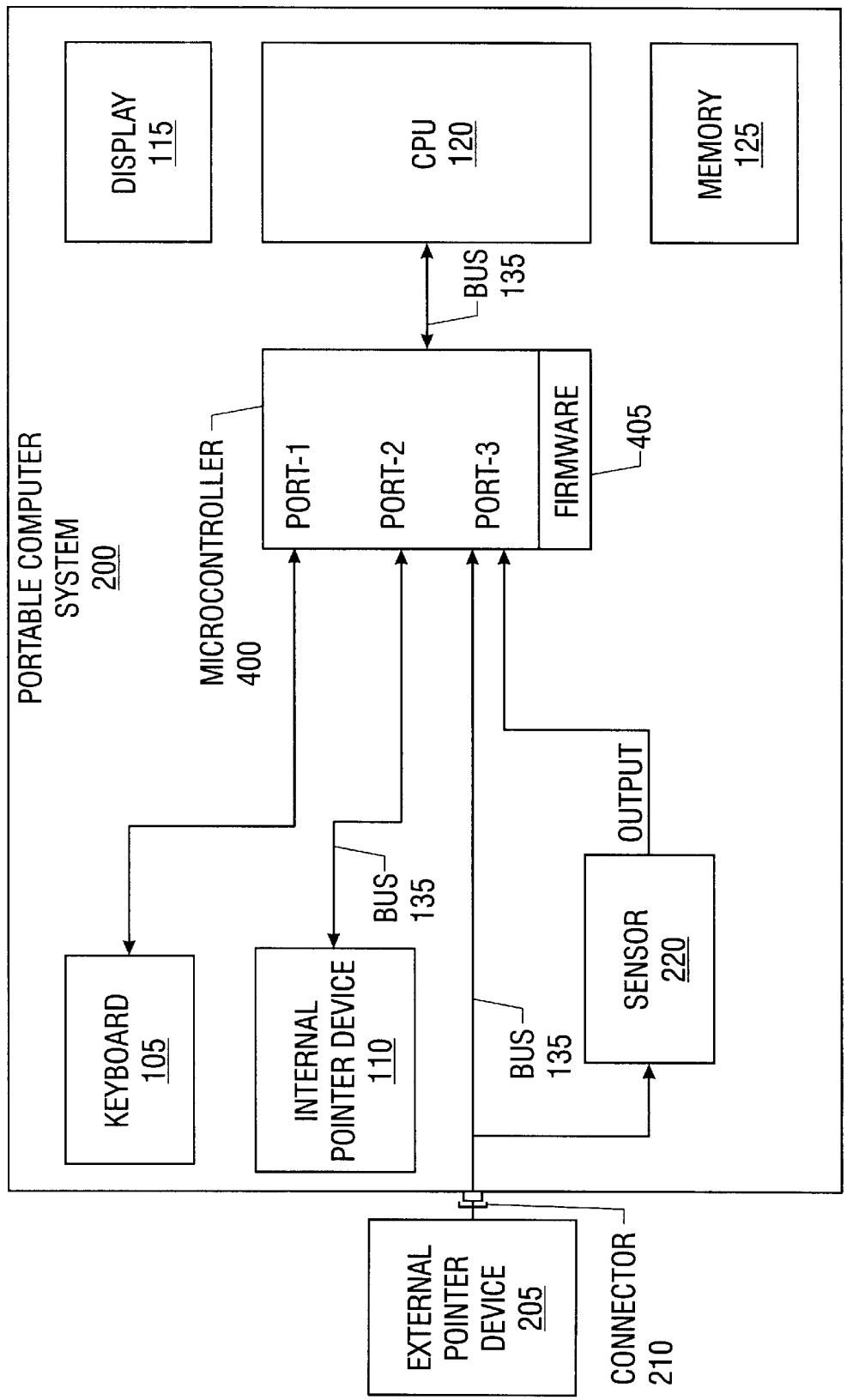
FIG. 4 shows a block diagram of an alternative embodiment.

In an alternative embodiment, shown in FIG. 4, the switch 215 of FIGS. 2 and 3 can be eliminated. Instead, the bi-directional clock and data signals (represented by bus 135) to/from the external pointer device 205 are coupled to a third port of the microcontroller 400. Output from the sensor is also coupled to the microcontroller's 400 third port. In this embodiment, the microcontroller's firmware 405 must be modified to periodically poll that terminal to which the sensor's output is connected and, if that terminal has a value corresponding to an asserted level, then to functionally couple the external pointer device 205 to the CPU 120. It is noted that this action has the effect of functionally disconnecting the internal pointer device 110 from the CPU 120.

An important aspect of the sensor 220 is that its output is preferably static. That is, as long as the external pointer device 205 is connected to the portable computer system 200, the sensor's output is asserted. This allows the microcontroller 400 to determine when (or if) an external pointer device is connected simply by determining the value of the signal on that terminal connected to the sensor's 220 output. Because the microcontroller firmware 405 is independent of the computer system's operating system, it can perform this task independent of the machine state. The microcontroller may also store parameters sent to the pointing device (either the internal or external devices, or both) to modify the behavior of the device (sensitivity, etc.) when switching between pointing devices.

4.3 An Optical Sensor Embodiment

Figure 5:
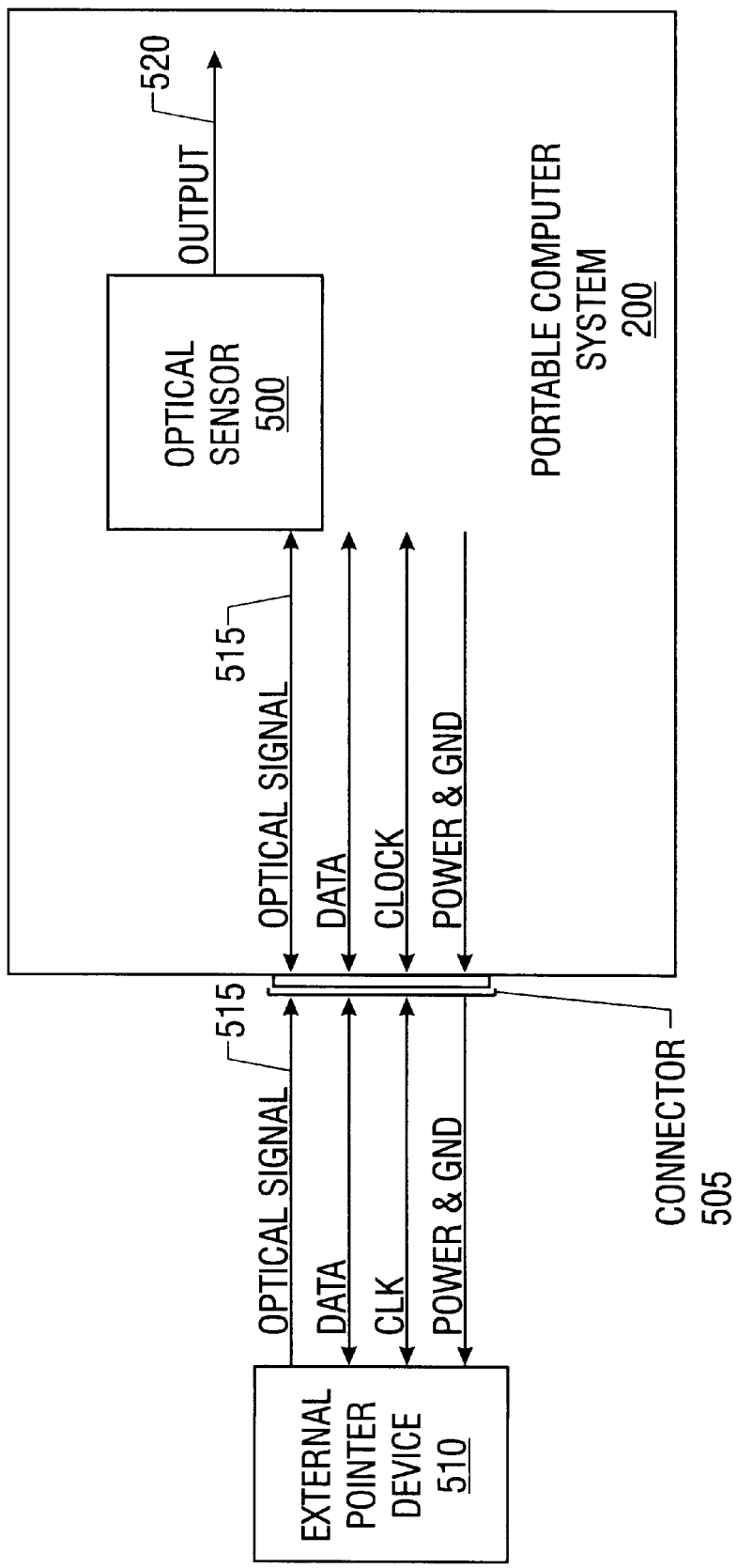
FIG. 5 shows a connector for use with an optical sensor in accordance with the invention.

FIG. 5 illustrates the use of an optical sensor 500 in combination with a modified connector 505 to detect when an external pointer device 510 is physically connected to a portable computer system 200. In this embodiment, the external pointer device 510 provides an optical signal 515 that is coupled to the optical sensor 500 via the connector 505. Sensor output 520 may be provided to a switch 215 or microcontroller 400 as described above.

Figure 6:
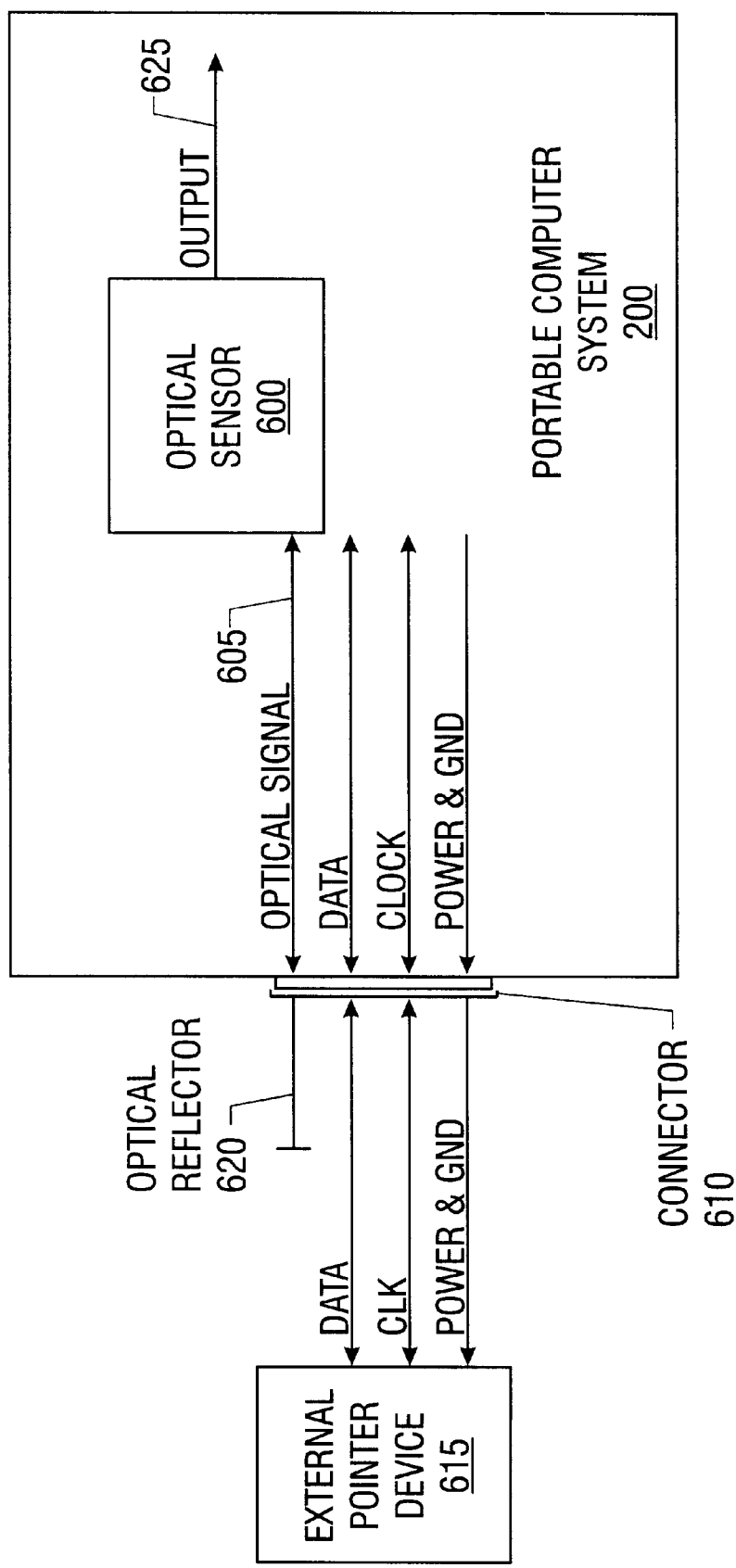
FIG. 6 shows an alternative use of an optical sensor in accordance with the invention.

Yet another alternative to this basic concept is shown in FIG. 6. In this embodiment the sensor 600 itself produces an optical signal 605 that is routed to a connector 610. When a mating connector from an external pointer device 615 is connected, the optical signal from the sensor may be reflected back to the sensor, by an optical reflector 620. The reflected signal is detected by sensor 600 and indicates that an external pointer device is connected. In response, the sensor 600 generates an output 625 that may be coupled to either a switch 215 or a microcontroller 400 as described above. Alternatively, the optical sensor 600 could generate an optical signal, route it to a connector which has, within it, an optical path that routes the signal back to the sensor. When an external pointer device is inserted into the connector the optical path would be broken. The optical sensor would detect the absence of an optical signal and issue an output signal as before.

It will be appreciated by those of ordinary skill having the benefit of this disclosure that numerous variations from the foregoing illustrations will be possible without departing from the inventive concept described herein. Accordingly, it is the claims set forth below, and not merely the foregoing illustration, which are intended to define the exclusive rights claimed in this application program.

What is claimed is:

1. A circuit for operatively selecting between an internal device and an external device in a computer system comprising:

a sensor adapted to couple to the external device, the sensor further adapted to generate an output having a first specified value when the internal device is present and a second specified value when the external device is present; and a switch having a first bus coupled to the internal device, a second bus adapted to couple to the external device, a third bus, and a select input coupled to said sensor output, wherein the switch operatively couples said external device to said third bus when the sensor output is the first specified value and couples said internal device to said third bus when the sensor output is the second specified value, the switch operating automatically and independent of a computer system state.

2. The circuit of claim 1, wherein said computer system is a notebook computer system.

3. The circuit of claim 1, wherein said sensor comprises:
(a) a resistor in series between the external device and a power source;
(b) a comparator having a first input coupled to said resistor, a second input coupled to a substantially fixed reference voltage signal, and an output,
(c) wherein said output is a first specified voltage when said first input is substantially equal to or less than said reference voltage and a second specified voltage otherwise.

4. The circuit of claim 1, wherein said external device is a pointer device.

5. The circuit of claim 4, wherein said pointer device is selected from the group consisting of a mouse, a trackball, a touch pad, joystick, and a keyboard.

6. The circuit of claim 1, wherein said internal device is a pointer device.

7. The circuit of claim 6, wherein said pointer device is selected from the group consisting of a mouse, a trackball, a touch pad, and a keyboard.

8. The circuit of claim 1, wherein said third bus is operatively coupled to a keyboard microcontroller.

9. The circuit of claim 1, wherein said switch is a QUICKSWITCH.

10. The circuit of claim 1, wherein each of said first bus, second bus, and third bus comprise a clock signal line and a data signal line.

11. The circuit of claim 1, wherein said external device is mechanically connected to the computer system through a connector, said connector having a grounded shell wherein the sensor comprises a contact in the connector that forms an electrical connection between a power source and the grounding shell when the external device is inserted.

12. The circuit of claim 11, wherein the sensor is an optical sensor receiving light from an opposing light source whose beam is broken by the insertion of an external pointer device.

13. The circuit of claim 12, wherein said light source and said sensor are powered on a periodic basis by a microcontroller.

14. The circuit of claim 11, wherein said sensor is a reflective optical sensor having a source beam which is reflected by the connector when the external device is inserted into said connector.

15. The circuit of claim 14, wherein said light source and said sensor are powered on a periodic basis by a microcontroller.

16. A circuit for operatively selecting between an internal device and an external device in a computer system, said computer system having a main processor and a keyboard controller, said keyboard controller having a first port operatively connected to the internal device and a second port operatively connected to the external device, comprising:
(a) a current sensor operatively coupled to the external device and having a sensor output at a first specified value when the external device is present and a second specified value when the external device is absent;
(b) a comparator having a first input coupled to said current sensor output, a second input coupled to a substantially fixed reference signal, and a comparator output operatively coupled to the keyboard controller; and
(c) selection means for selectively routing signals, automatically and independent of the computer system state, between said main processor and one of said external device and internal device based on said comparator output.

17. The circuit of claim 16, wherein said computer system is a portable computer system.

18. The circuit of claim 16, wherein said current sensor comprises a resistor in series between the external device and a power source.

19. The circuit of claim 16, wherein said comparator comprises:
(a) a first input coupled to said sensor output;
(b) a second input coupled to a substantially fixed reference voltage signal, and an output,
wherein said output is a first specified voltage when said first input is substantially equal to or less than said reference voltage and a second specified voltage otherwise.

20. The circuit of claim 16, wherein said external device is a pointer device.

21. The circuit of claim 20, wherein said pointer device is selected from the group consisting of a mouse, a trackball, a touch pad, joystick, and a keyboard.

22. The circuit of claim 16, wherein said internal device is a pointer device.

23. The circuit of claim 22, wherein said pointer device is selected from the group consisting of a mouse, a trackball, a touch pad, and a keyboard.

24. The circuit of claim 16, wherein said external device is mechanically connected to the computer system through a connector, said connector having a grounding shell wherein the current sensor comprises a contact in the connector that forms an electrical connection between a power source and the grounding shell when the external device is inserted.

25. The circuit of claim 24, wherein the current sensor is an optical sensor receiving light from an opposing light source whose beam is broken by the insertion of an external pointer device.

26. The circuit of claim 25, wherein said light source and said current sensor are powered on a periodic basis by a microcontroller.

27. The circuit of claim 24, wherein said current sensor is a reflective optical sensor having a source beam which is reflected by the connector when the external device is inserted into said connector.

28. The circuit of claim 27, wherein said light source and said current sensor are powered on a periodic basis by a microcontroller.

29. A portable computer comprising:
(a) a processor;
(b) a built-in pointing device;
(c) a port adapted to receive a connector of an external pointing device, referred to as an external pointer port;

(d) a current sensor operatively coupled to detect a current flow through the external pointer port and having an output at a first specified value when the external device is connected to the external pointer port and a second specified value when the external device is disconnected to the external pointer port; and (e) a switch operatively coupled to the output of the current sensor and configured to route signals, automatically and independent of the computer state, between the processor and one or the other of (1) the external pointer port and (2) the internal pointing device in response to said output.

30. The portable computer of claim 29, wherein said current sensor comprises:

(a) a resistor in series between the external pointer port and a power source;

(b) a comparator having a first input coupled to the resistor, a second input coupled to a substantially fixed reference voltage signal, and an output, (c) wherein said output is a first specified voltage when said first input is substantially equal to or less than said reference voltage and a second specified voltage otherwise.

31. The portable computer of claim 29, wherein said built-in pointing device is one of a mouse, a trackball, a touch pad, or a joystick.

32. A portable computer comprising:

(a) a processor;

(b) a built-in pointing device selected from the group consisting of a mouse, a trackball, a touch pad, and a joystick;

(c) a port adapted to receive a connector of an external pointing device, referred to as an external port;

(d) a current sensor operatively coupled to detect a current flow through the external port, said current sensor comprising (1) a resistor in series between the external port and a power source, and (2) a comparator having (i) a first input coupled to the resistor, (ii) a second input coupled to a substantially fixed reference voltage signal, and (iii) an output, (e) wherein said output is a first specified voltage when said first input is substantially equal to or less than said reference voltage signal and a second specified voltage otherwise; and (f) a switch operatively coupled to the output of the current sensor and configured to route signals, automatically and independent of the computer state, between the processor and one or the other of (1) the external port and (2) the internal pointing device in response to said output.

* * * * *